(12) United States Patent  (10) Patent No.: US 8,047,337 B2
Strandberg et al.  (45) Date of Patent: Nov. 1, 2011

(54) WHEEL BRAKE FOR A VEHICLE AND A VEHICLE COMPRISING THE WHEEL BRAKE

(75) Inventors: Jonny Strandberg, Eskilstuna (SE); Dan Popescu, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 438 days.

(21) Appl. No.: 12/297,454

(22) PCT Filed: Apr. 28, 2006

(86) PCT No.: PCT/SE2006/000521
§ 371 (c)(1),
(2), (4) Date: Oct. 17, 2008

(87) PCT Pub. No.: WO2007/126348
PCT Pub. Date: Nov. 8, 2007

(65) Prior Publication Data
US 2009/0101458 A1  Apr. 23, 2009

(51) Int. Cl.
*F16D 55/36* (2006.01)
(52) U.S. Cl. .................................... 188/71.5; 192/70.14
(58) Field of Classification Search ................. 188/71.5, 188/71.6; 192/70.12, 70.14, 70.2, 70.28, 192/107 C
See application file for complete search history.

(56) References Cited

U.S. PATENT DOCUMENTS

| | | | |
|---|---|---|---|
| 2,174,240 A | 9/1939 | Glenney | |
| 2,738,864 A | 3/1956 | Becker | |
| 3,994,378 A | 11/1976 | Schwabe et al. | |
| 4,058,027 A | 11/1977 | Webb | |
| 4,356,901 A * | 11/1982 | Koehler et al. | 192/70.2 |
| 4,676,356 A * | 6/1987 | Beccaris et al. | 192/70.28 |
| 5,295,908 A | 3/1994 | Schumann et al. | |
| 6,357,558 B1 * | 3/2002 | Case et al. | 188/71.5 |
| 6,405,837 B1 * | 6/2002 | Muramoto | 188/72.5 |
| 6,516,924 B1 * | 2/2003 | Michael et al. | 188/71.5 |
| 2003/0070896 A1 | 4/2003 | Landa et al. | |

OTHER PUBLICATIONS

International Search Report for corresponding International Application PCT/SE2006/000521.

* cited by examiner

*Primary Examiner* — Christopher Schwartz
(74) *Attorney, Agent, or Firm* — WRB-IP LLP

(57) ABSTRACT

A wheel brake for a vehicle including a brake disc unit adapted to brake the rotation of a rotation element, which is adapted to be drivingly connected to the wheel. The brake disc unit includes a first set of discs and a second set of discs arranged in an alternating manner in an axial direction. The discs in the first disc set are adapted to be rotationally rigidly connected to the rotation element. The brake disc unit includes at least one separator element, which is adapted to keep a sufficient distance between two adjacent discs of one of the disc sets for an intermediate disc from the other disc set to rotate at least substantially freely relative to the spaced discs when the brake disc unit is in a deactivated condition.

20 Claims, 5 Drawing Sheets

WHEEL BRAKE FOR A VEHICLE AND A VEHICLE COMPRISING THE WHEEL BRAKE

BACKGROUND AND SUMMARY

The invention is related to a wheel brake for a vehicle comprising a brake disc unit adapted to brake the rotation of a rotation element, which is adapted to be drivingly connected to the wheel, wherein the brake disc unit comprises a first set of discs and a second set of discs arranged in an alternating manner in an axial direction, wherein the discs in said first disc set are adapted to be rotationally rigidly connected to said rotation element. The invention also relates to a vehicle comprising the wheel brake.

This type of disc brake is commonly used at each wheel of a work vehicle. The term "work vehicle" comprises different types of material handling vehicles like construction machines, such as a wheel loader, an articulated hauler, a backhoe loader, a motor grader and an excavator. Further terms frequently used for work vehicles are "earth-moving machinery" and "off-road work machines". The work vehicles are for example utilized for construction and excavation work, in mines etc. The invention will be described below in a case in which it is applied in an articulated hauler. This is to be regarded only as an example of a preferred application. The invention may, for example, also be used in other heavy vehicles such as trucks and buses.

The discs in the first disc set are rotationally rigidly-connected to the rotation element and displaceable along their centre axis. The discs in the second disc set may be stationary, e.g. by being connected to the housing of the brake. More precisely the discs in the second disc set are prevented from rotation around their centre axis but are also displaceable along said centre axis. Upon activation of the brake disc unit the stationary discs are forced towards each other by means of an activation means, such as a piston, or the like, wherein the intermediate discs of the first disc set are clamped. The free distance between two adjacent discs from different sets of discs, or from the same set of discs, is not definite when the brake disc unit is deactivated. The discs are solely allowed to diverge upon deactivation by retracting the activation means, but the diversion of the discs is not controlled.

When the brake disc unit is deactivated (retraction of the activation means) after a braking operation, the discs may in some situations not be totally separated from each other, but may instead stay in contact with each other. Further, when the vehicle is operated on a sloping ground, the brake disc unit will be tilted and the discs may be displaced towards each other due to gravity and come into contact with each other. A work vehicle is frequently used to transport heavy loads from one location to another, often encountering varying grade slopes on the route between two or more locations. If the discs are in contact during propulsion they are subject to considerable wear, at the same time as the generation of heat is increased. This leads to a higher need of cooling by lubricating oil, a higher fuel consumption and a more frequent maintenance.

It is desirable to achieve a wheel brake which creates conditions for a more efficient energy consumption of the vehicle during operation. The invention especially aims for a wheel brake, in which the discs are efficiently separated when the wheel brake is in the deactivated condition.

According to an aspect of the invention, the brake disc unit comprises at least one separator element, which is adapted to keep a sufficient distance between two adjacent discs of one of the disc sets for an intermediate disc from the other disc set to rotate at least substantially freely relative to the spaced discs when the brake disc unit is in a deactivated condition. In other words, the intermediate disc is at least substantially free from frictional contact with the adjacent, spaced discs when the brake disc unit is in the deactivated condition. In other words, two adjacent discs from different disc sets may rotate freely relative to one another. The separator element is preferably adapted for keeping a predetermined distance between the adjacent discs when the brake disc unit is in the deactivated condition. The separator element may either be adapted for spacing stationary brake discs or rotation brake discs (friction discs) and the intermediate disc may either be a stationary disc or a rotation disc.

According to a preferred embodiment, said separator element is variable between a first state, in which the intermediate disc may rotate at least substantially freely relative to the adjacent spaced discs, and a second state, in which the intermediate disc is clamped between the adjacent discs of the other disc set. Thus, the separator element is in the first state when the brake disc unit is in the deactivated condition and in the second state when the brake disc unit is in the activated condition.

According to a further preferred embodiment, the separator element has a larger axial extension than the intermediate disc in the first state, and at least as small axial extension as the intermediate disc in the second state. Preferably, the separator element is resilient in order to adopt the first and second state, wherein the separator element is adapted to have a larger potential energy in the second state than in the first state.

According to a further preferred embodiment, the separator element extends from one of the discs. In this way, no additional device is required for the separation, which creates conditions for reducing the material cost and the assembly work needed. Preferably, the separator element forms a unitary part with one of the discs.

According to a further preferred embodiment, the separator element is positioned at the outer periphery of the associated disc. Thus, the separator element is adapted to bridge the gap between the two adjacent discs in the same disc set and abut the neighbouring disc in a space efficient way.

According to a further preferred embodiment, a plurality of separator elements are circuxnferentially spaced along the associated disc. An efficient separation of the two adjacent discs is achieved in this way.

Further preferred embodiments and advantages will be apparent from the following description and drawings.

BRIEF DESCRIPTION OF THE DRAWINGS

The invention will be explained below, with reference to the embodiments shown on the appended drawings, wherein.

DETAILED DESCRIPTION

Figure 1:
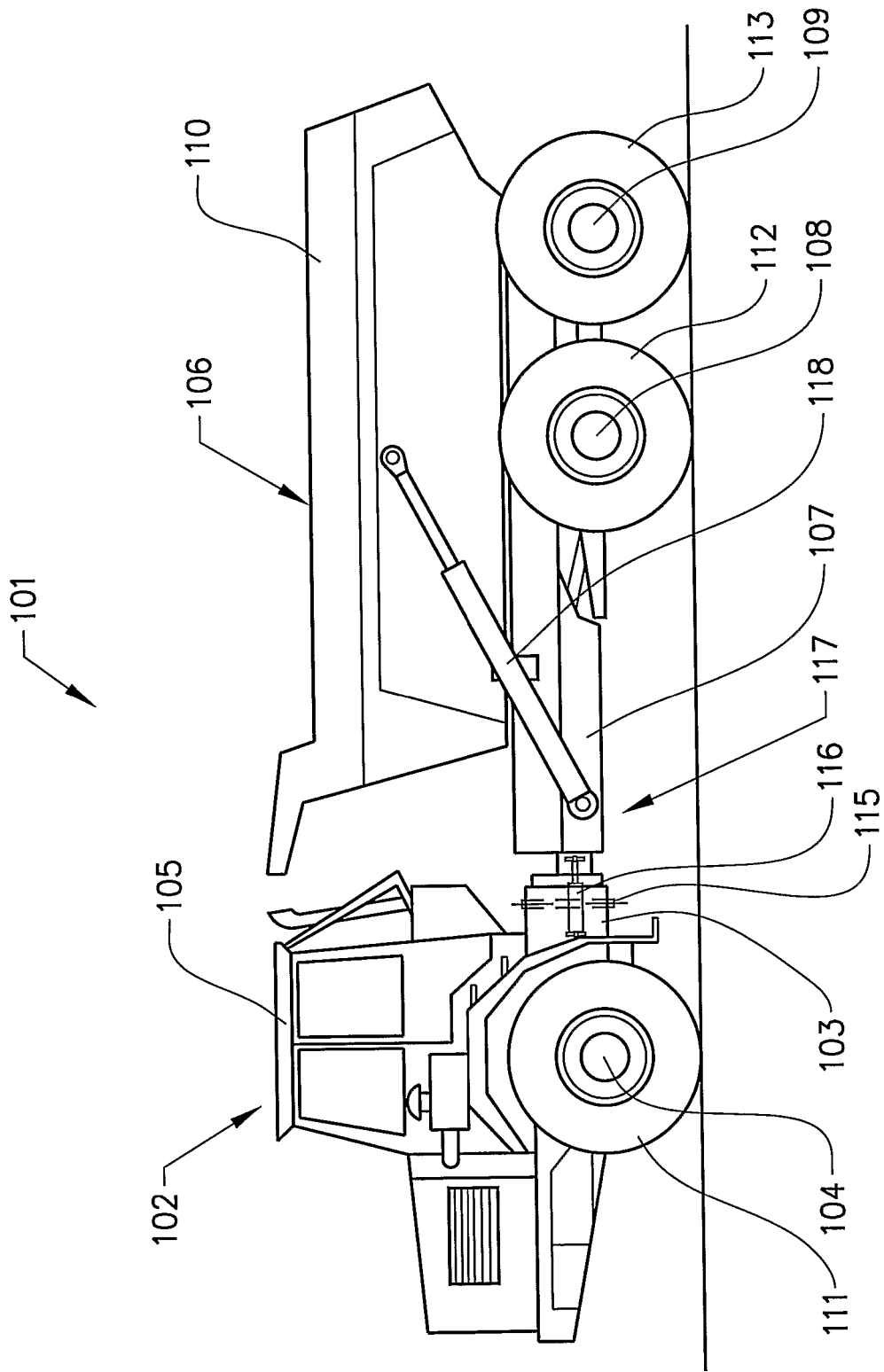
FIG. 1 is a side view of an articulated hauler.

FIG. 1 illustrates a frame-steered work vehicle in the form of an articulated hauler 101. The articulated hauler 101 comprises a forward vehicle section 102 comprising a forward frame 103, a front wheel axle 104 a power source in the form of an engine (not shown) for propelling the vehicle and a cab 105. The articulated hauler 101 also comprises a rear vehicle section 106 comprising a rear frame 107, a forward bogie axle 108, a rear bogie axle 109 and a tiltable load-carrying platform 110. Each axle comprises a left ground engagement element 111, 112, 113 and a right ground engagement element (not shown) in the form of wheels having rubber tyres.

The forward frame 103 is connected to the rear frame 107 by means of an articulation joint 115 allowing the forward vehicle section 102 and the rear vehicle section 106 to pivot relative to one another about a vertical axis. A pair of actuators in the form of hydraulic cylinders 116 is arranged one on each side of the articulation joint 115 and controlled by an operator via a steering wheel and/or a joy stick (not shown) for steering of the vehicle. The hydraulic cylinders 116 work as a pair, when one of them is extended the other one is contracted. Thus, the hydraulic cylinders 116 are arranged one on each side of a longitudinal centerline of the vehicle in the travelling direction of the vehicle in order to turn the vehicle.

A further articulation joint 117 is configured for allowing the forward vehicle section 102 and the rear vehicle section 106 to pivot relative to one another about an imaginary longitudinal axis, i.e. an axis extending in the longitudinal direction of the vehicle 101. In this way, the forward vehicle section 102 and the rear vehicle section 106 are allowed to move substantially independent from each other.

The load-carrying platform 110 is pivotably connected to the rear end of the rear frame 107. A pair of tilting actuators 118, in the form of hydraulic cylinders, is connected at a first end to the rear frame 107 and at a second end to the load-carrying platform 110. The tilting cylinders 118 are arranged one on each side of the longitudinal centerline of the vehicle. Thus, the loading platform 110 is tilted in relation to the rear frame 107 by activation of the tilting cylinders 118.

A powertrain is adapted to drive the wheels 111, 112, 113. The power is transmitted from the engine via a transmission and longitudinal drive shafts (propeller shafts) to each drive axle. More precisely, a central angular gear (a differential gear) is arranged in each axle casing, which divides the power to the left and right wheel via transverse drive shafts 201 and a final drive unit 202 at each wheel, see FIG. 2.

Figure 2:
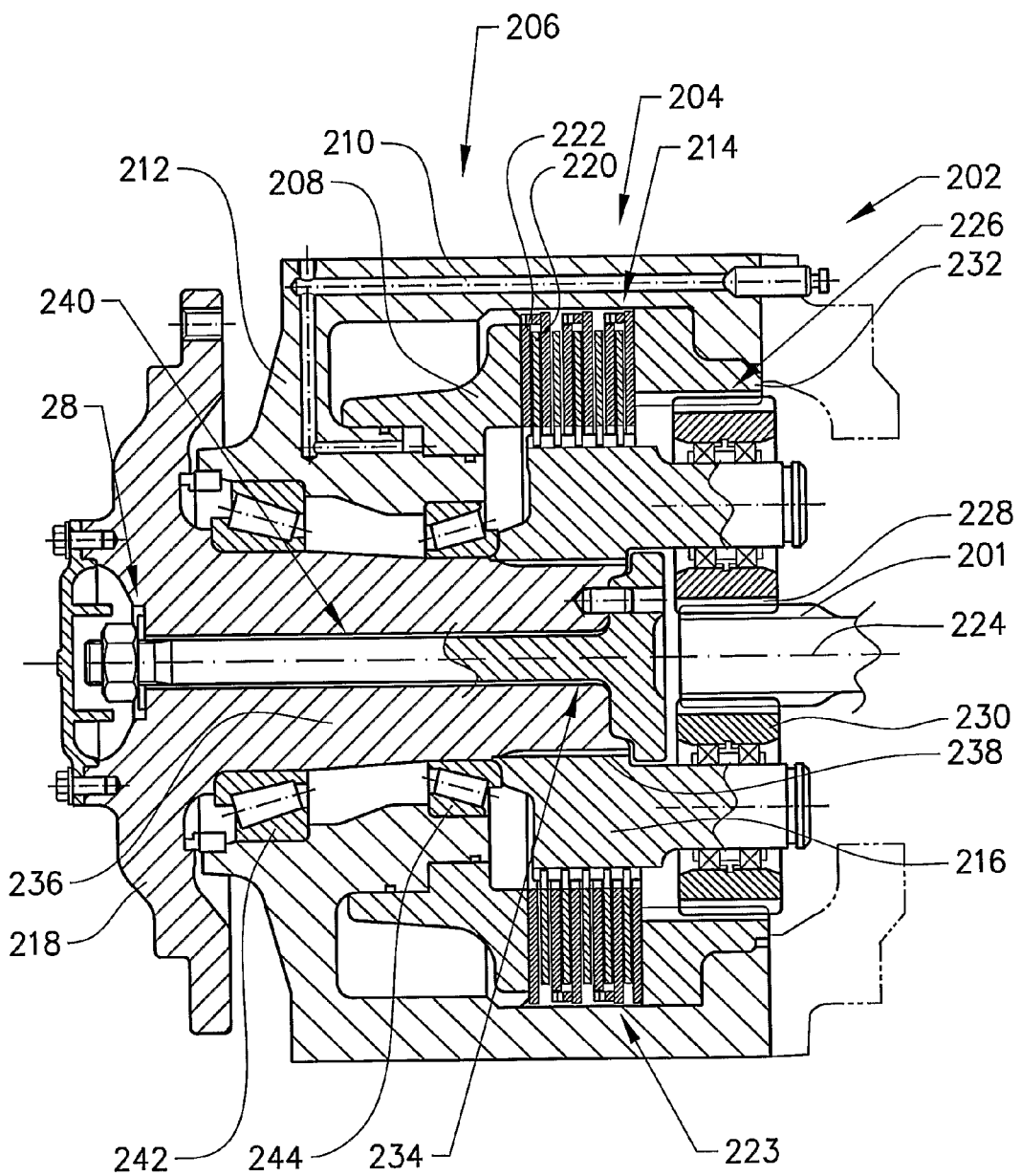
FIG. 2 is a cut side view of a final drive comprising a wheel brake according to a first embodiment.

A wheel brake 204 is shown in FIG. 2. The wheel brake 204 forms a friction brake and is integrated in the final drive unit 202. The wheel brake 204 is a wet brake and forms a service brake for reduction of the speed of the vehicle. The wheel brake 204 is adapted to be activated hydraulically via activation means 206 comprising a brake piston 208. A hydraulic oil duct 210 is arranged through a housing 212 for supplying oil to the piston 208.

The wheel brake 204 comprises a brake disc unit 214, which is adapted to brake the rotation of a rotation element 216, which is drivingly connected to a wheel hub 218. The brake disc unit 214 comprises a first set of discs 220 and a second set of discs 222 arranged in an alternating manner in an axial direction 224. The discs 220 in said first disc set are rotationally rigidly connected to said rotation element 216. The discs 222 in said second disc set are non-rotationally connected to the casing 212. The discs in said first disc set are preferably all of the same type. The discs in said second disc set are preferably also all of the same type.

The discs 220, 220 are displaceable along their centre axis 224. Upon activation of the brake disc unit the stationary discs 222 are forced towards each other by means of the piston 208. Thus, the activation means 206 is adapted to activate the wheel brake 204 by compressing the discs 220,222 by displacing them in the axial direction, wherein the rotation discs 220 are clamped.

The wheel brake 204 comprises an arrangement 223 of a plurality of separator elements 302 (see FIGS. 3 and 4), which are adapted to separate the brake discs 220,222 after a brake activation. Further, the arrangement 223 of separator elements ensures that a sufficient distance between two adjacent discs of one of the disc sets is maintained so that an intermediate disc from the other disc set may rotate at least substantially freely relative to the spaced discs when the brake disc unit is in a deactivated condition. The arrangement of the separator elements 302 will be described in more detail below with reference to FIGS. 3 and 4.

The final drive unit 202 comprises a planetary gear 226, see FIG. 2. The drive shaft 201 forms a power input to the planetary gear 226. A sun gear 228 is arranged at the end of the transverse drive shaft 201. The planetary gear 226 further comprises a planet carrier 216, at least one planet wheel 230 which is mounted on a journal extending from the planet carrier 216. The planet wheel 230 is arranged in engagement with the sun gear 228, and a stationary ring gear 232.

The planet carrier 216 forms a power output from the planetary gear 226. The planet carrier 216 is connected in a rotationally fixed manner to the wheel hub 218. The planet carrier 216 comprises a central opening 234, which receives a journal 236 extending from the wheel hub 218. Means 238, preferably axial splines, is adapted to transmit torque between the planet carrier 216 and the hub 218.

The wheel is rotationally locked to the wheel hub 218 via bolts (not shown) and the planetary gear 226 is connected between the transverse drive shaft 201 and the wheel hub. The planetary gear 226 produces a reduction in rotational speed from the transverse drive shaft 201 to the hub 218 and an increase in torque from the drive shaft to the hub.

An arrangement 240 is adapted for fixing the hub 218 and the planet carrier 216 in the intended position relative to one another in the axial direction. Further, the hub 218 is mounted in the housing 212 via two spaced conical roller bearing 242,244.

The planet carrier 216 consists of or comprises an annular body. The rotational brake discs 220 are rotationally locked to the planet carrier 216. The rotational brake discs 220 are therefore adapted to rotate at wheel speed. A radial outer surface of the planet carrier 216 comprises splines extending in the axial direction. The rotational brake discs 220 comprise a correspondingly shaped toothed structure 402 at the inner periphery for engagement with the splines (see FIG. 4). Thus, the rotational discs 220 are axially guided by the splines.

The stationary brake disks 222 are guided axially in splines arranged internally in the housing 212. Thus, the stationary brake disks 220 comprise a correspondingly shaped toothed structure 404 at the outer periphery for engagement with the internal splines (see FIG. 4).

The outer ring gear 232 is adapted to form a counterpressure surface for the brake. The counterpressure surface is arranged on an opposite side of the brake in the axial direction 224 relative to the brake piston 208.

Figure 3:
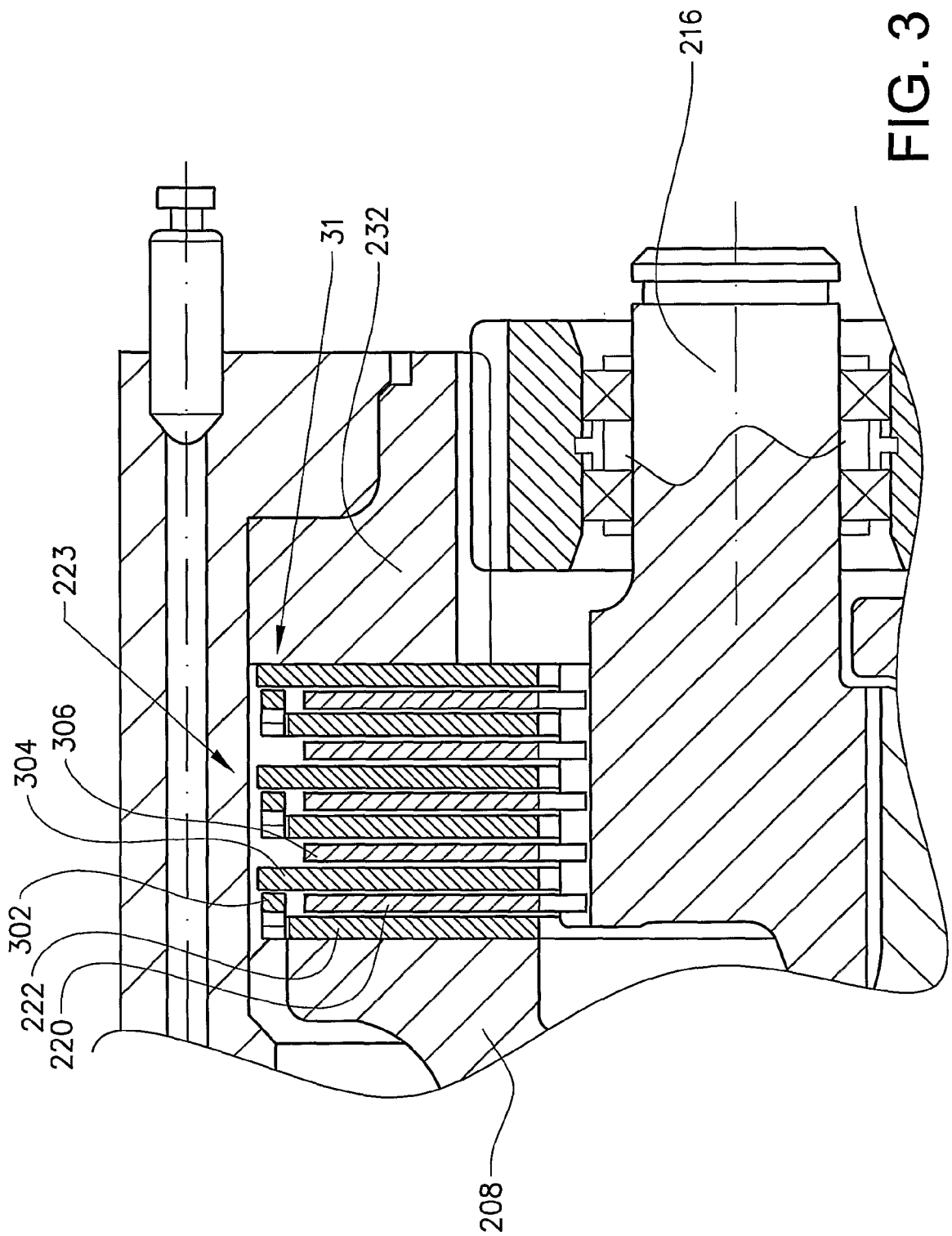
FIG. 3 is an enlarged view of a part of the wheel brake in FIG. 2.

FIG. 3 is an enlarged view of a part of the wheel brake 204 in FIG. 2, showing the disc separation arrangement 223. At least one separator element 302 is adapted to keep a sufficient distance between two adjacent discs 222,304 of one of the disc sets for an intermediate disc 220 from the other disc set to rotate at least substantially freely relative to the spaced discs 222,304 when the brake disc unit is in a deactivated condition. More specifically, the separator element 302 is adapted to keep the distance between two adjacent stationary discs 222,304. The predetermined distance is retained until the next brake activation. The separator element 302 is positioned between and span the distance between said two adjacent stationary discs.

The separator element 302 is variable between a first state, in which the intermediate, rotational disc 220 may rotate at least substantially freely relative to the adjacent spaced stationary discs 222,304, and a second state, in which the intermediate disc 220 is clamped between the adjacent discs 222, 306 of the other disc set. The separator element 302 will be in the first state when the brake disc unit is deactivated and in said second state when the brake disc unit is activated. The separator element 302 is resilient and adapted to return the adjacent discs 222,304 to the spaced apart state, in which the intermediate disc is free to rotate, after a brake activation. Thus, the separator element 302 is adapted to have a larger potential energy in the second state (compressed state) than in the first state (non-compressed state).

The separator element 302 has a larger axial extension than the intermediate disc 220 in the first state, and at least as small axial extension as the intermediate disc in the second state. Further, the separator element 302 has an extension with a component both in an axial direction and a radial direction. More specifically, the separator element 302 extends from a main disc body of the stationary disc 222 and is inclined towards the adjacent stationary disc 304. The separator element 302 is adapted to abut the stationary adjacent disc 304. More specifically, the separator element 302 is positioned at the periphery of the disc 222. Further, the separator element 302 forms a unitary part with the disc 222.

The rotatable discs 220,306 may be coated with a friction lining, e.g. made up of pressed paper glued to the discs, and may be called frictional discs.

Figure 4:
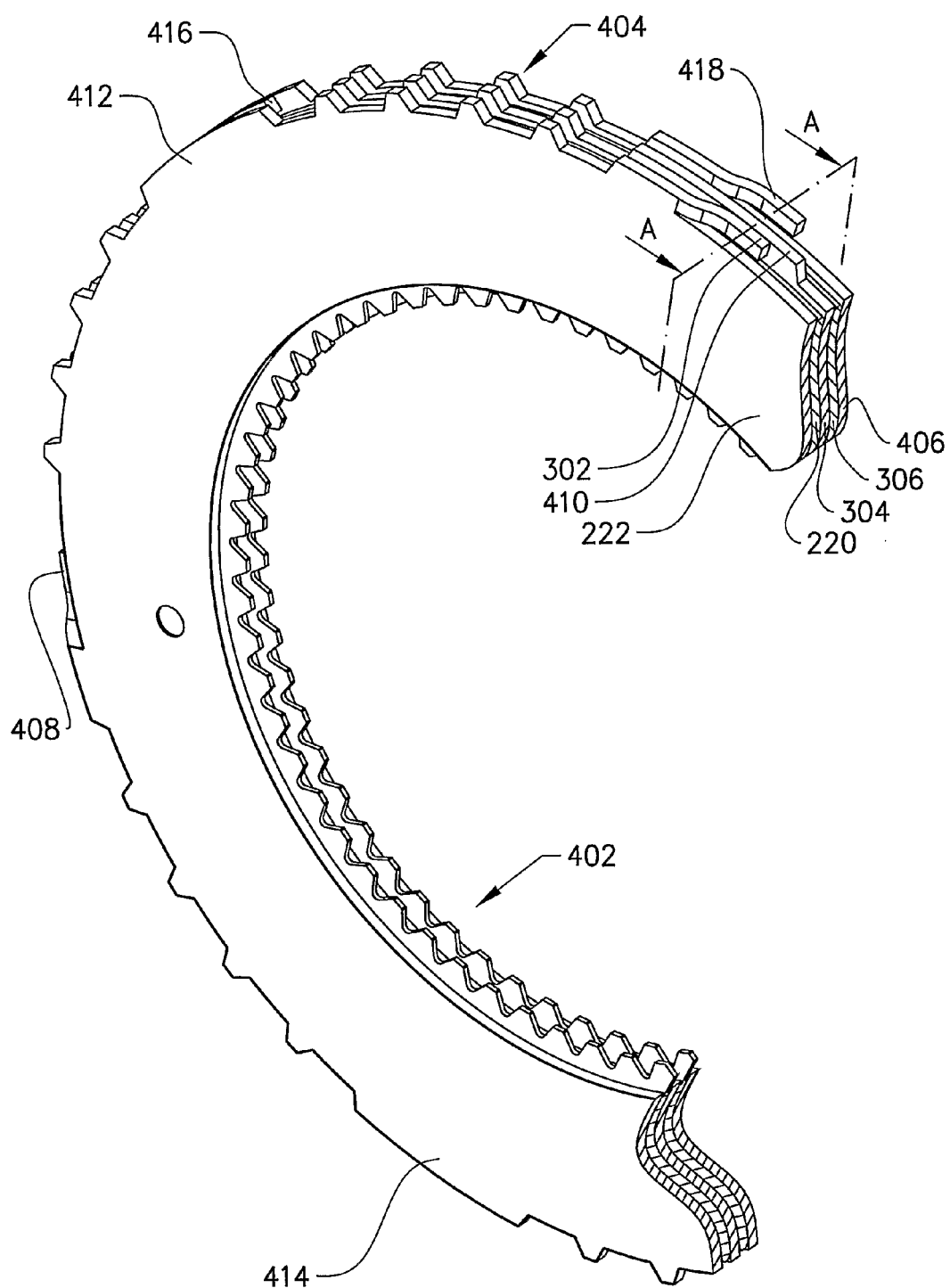
FIG. 4 is a perspective view of a plurality of brake discs according to FIGS. 2 and 3.

FIG. 4 is a perspective view of a plurality of brake discs according to FIGS. 2 and 3. The position of the cross section of FIG. 3 is indicated with the cut A-A in FIG. 4. More precisely, three stationary discs 222, 304, 406 and two intermediate rotatable discs 220,306 are shown. A plurality of separator elements 302,408 are circumferentially spaced along each stationary disc 222. Thus, a plurality of additional separator elements 408 are adapted to keep the sufficient axial distance for the intermediate rotational disc 220 to rotate at least substantially freely when the brake disc unit is in the deactivated condition.

The separator element 302 forms a projection protruding from each of the stationary discs 222. The projection may be formed by a first, preferably flat, finger connected to the disc, or a first finger constituting a part of the disc, extending from a main disc body of the disc. The first finger 302 extends in a radial direction from the main disc body of the stationary disc 222 has its main extension direction in the circumferential direction. Further, the projecting part is inclined towards the adjacent stationary disc 304. A second, preferably flat, finger 410 extends radially from the adjacent stationary disc 304 and is preferably in flush with the main disc body. Further, the first finger 302 is adapted to interact with and abut the second finger 410. At least one of the first finger 302 and the second finger 404 is resilient. The second finger 410 will be pushed back by means of the first finger of the adjacent stationary disc, or vice versa, or a combination thereof depending on the nature of resilience and geometry of the first and second finger.

According to a preferred embodiment, each stationary disc 222 is equipped with at least one first inclined projection 302 and at least one second projection 412,414, which is in flush with the main disc body and forms a second finger extending in a radial direction from the main disc body. The first inclined projections 302,408 and the second, straight projections 412, 414 are arranged alternatively in the circumferential direction of the disc 222. At least one of the second projections 412,414 interacts with a first, inclined projection of an adjacent stationary disc. The stationary disc 222 comprises a splined structure 404 in the region between the separator elements 302, 412, 408, 414.

The stationary discs 222, 304, 406 are preferably all of the same type and design. Further, two adjacent stationary discs 222,304 are indexed relative to one another so that the separator elements 302,416 have different angular positions. More precisely, every second stationary disc 222,406 is arranged so that the separator elements 410,418 have the same angular position.

Preferably all stationary discs 222, 304, 406 in the brake disc unit is equipped with at least one first finger, but for some applications an appropriate effect is fulfilled if solely every second of the stationary discs are equipped with one first finger on each side of the disc. In addition, every other second stationary discs of the set of stationary discs of the brake disc unit may be equipped with at least one second finger, in order to abut every existing first finger of the stationary discs.

When the activation means of the brake disc unit is deactivated, the stationary discs 222, 304, 406 of the set of stationary discs are separated in a controlled way due to the inherent elasticity of said first fingers 302 and/or the second finger 410 and the frictional discs of the set of frictional discs 220,306 are idle and allowed to rotate.

If the vehicle is driven on a very sloping ground and is tilted, the stationary discs 222, 304, 406 stays separated and do not vibrate together. They will therefore not obstruct the rotation of the frictional discs 220,306 of the set of frictional discs, until the next activation.

Figure 5:
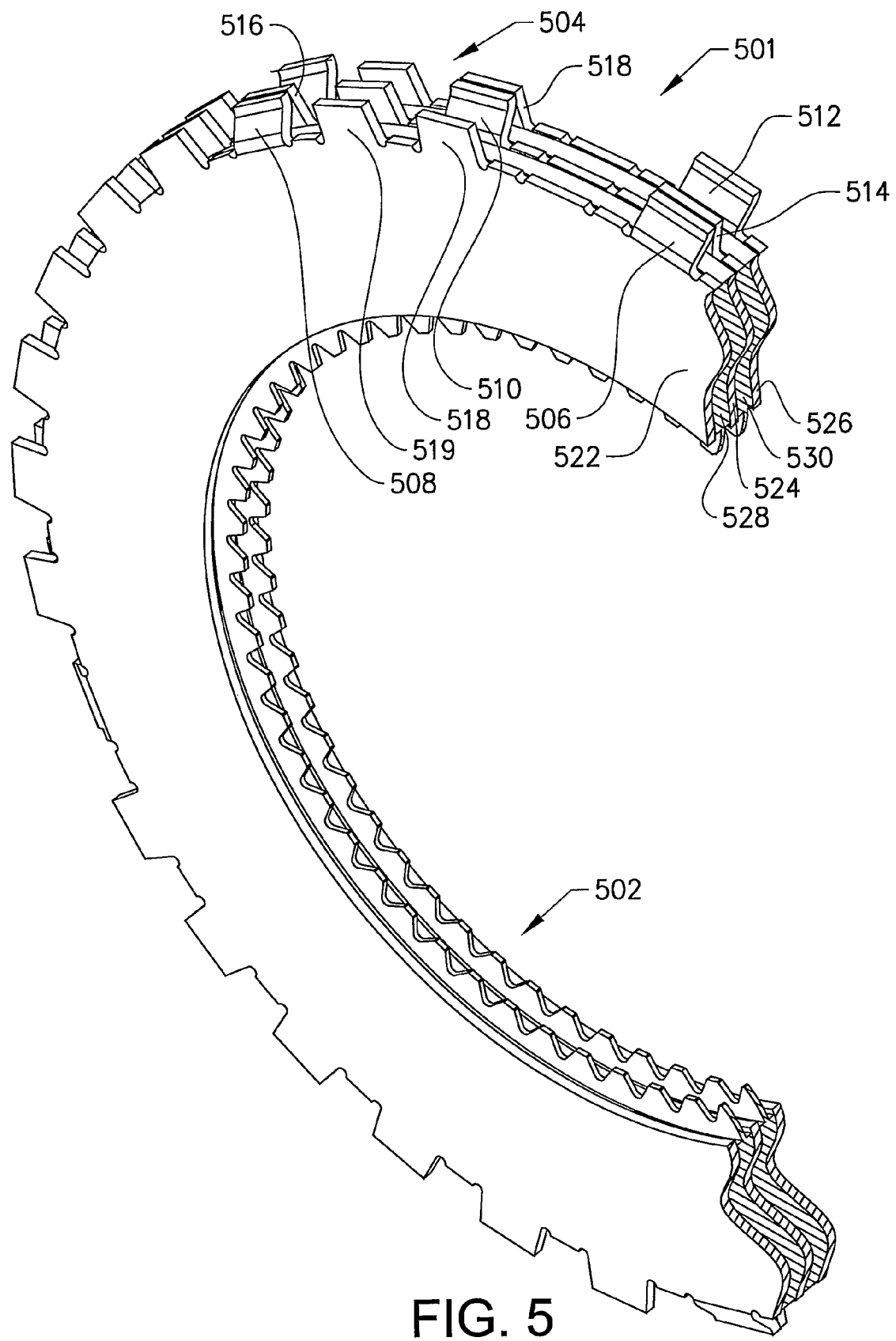
FIG. 5 is a variant of the wheel brake disc unit shown in FIG. 4.

FIG. 5 shows a second embodiment of an arrangement 501 of separator elements. The rotational brake discs 528,530 comprise a toothed structure 502 at the inner periphery for engagement with the splines on the rotational element 216. The stationary brake disks 522, 524, 526 comprise a toothed structure 504 at the outer periphery for engagement with the internal splines in the housing 212. Some of the protrusions/teeth 506, 508, 510, 512 are bent and form the abovementioned separator elements, or first fingers, which keeps the predetermined distance between the stationary discs 522, 524, 526 when the brake disc unit is in a deactivated state. Preferably, for the protrusions that are bent, the entire protrusions, or the outer part of the protrusion, are bent. The flat protrusions 514, 516, 518 on the adjacent stationary disc and flush with the associated main disc body, abutting the first fingers forms the abovementioned second fingers.

More specifically, one stationary disc 522 comprises a plurality of circumferentially spaced, inclined separator elements 506,508. At least one straight finger 518,519, i.e. flush with the main disc body, is postioned in the region between the separator elements 506,508.

In addition, the protrusions forming the first fingers 506, 508, 510, 512 may preferably be bent in two directions along the length of the protrusion. More precisely, in a first direction, close to or at the attachment to the main disc body, directed towards the adjacent disc and then in a second direction, close to or a small distance from the free end of the protrusion, directed substantially parallel with the adjacent second finger.

The invention must not be regarded as being limited to the exemplary embodiments described above, a number of further variants and modifications being feasible without departing from the scope of the following claims.

The rotational discs may be provided with other means for rotationally locking to the rotation element than the spline connection shown in FIG. 2-5. According to one alternative, each of the rotational discs is provided with circumferentially spaced through-holes. The arrangement of the through-holes matches to the arrangement of the planet wheel journals.

Further, the rotational brake discs are arranged so that the holes of several discs coincide and each of the planet wheel journals is received in the multiplicity of coinciding holes. Further, each of the rotational brake discs comprises an annular section, which is adapted to be brought into contact with an adjacent stationary brake disc when braking. This contact section is arranged radially outside said holes for the planet carrier journal.

Further, the invention is not limited to that the wheel brake is arranged for braking a rotational element rotating at wheel speed. For example, the wheel brake may be designed for braking a rotational element rotating at the speed of the transverse drive shaft. Thus, the wheel brake may be designed to brake the rotation of the transverse drive shaft directly.

According to a further alternative, none of the discs of the first and second disc sets necessarily needs to be stationary discs. Instead, both sets of discs may be adapted for connection to rotation elements of different speeds.

Further, the separator element may according to an alternative be a separate element extending from the housing or extending from each stationary disc. Said element may present an oval shape, or another suitable geometrical shape, having a first diameter larger than the width of the frictional disc and a second diameter smaller than the width of the frictional disc. In addition, said separator element in this embodiment is turnable, in order to allow movement of the stationary discs towards each other when the second diameter is more or less parallel with the centre axis of the frictional discs, and in order to separate the stationary discs when the first diameter is more or less parallel with said centre axis. In another embodiment said element may be resilient between a first state and a second state, instead of turnable.

It shall be pointed out that in an alternative embodiment of the present invention the element, projections, or first and second fingers, may extend from the inner circumference of the stationary discs. In other words, the frictional discs may be connected to the planet carrier at the outer circumference of the frictional discs and the stationary discs may then have the projections extending inwards.

Any number of separator elements is possible on one single disc. In the case of several separator elements, these are distributed along the discs and preferably equidistant distributed along the circumference of the discs.

It shall be pointed out that the ground engagement elements not necessarily have to be a wheel having a rubber tyre. Other suitable ground engagement elements are included.

It shall be realized that everything described about the correlation between the set of stationary discs and the elements/fingers is applicable on the rotatable discs as well.

It shall also be realized that the element may be controlled by means of pneumatics, hydraulics, electricity, etc., or be constituted by a helical spring, a rubber pin, or the like, in order to be variable between at least two states.

It shall also be pointed out that each stationary disc may be constituted by several discrete disc members distributed along the extension of the rotatable discs.

The invention claimed is:

1. A wheel brake for a vehicle comprising a brake disc unit adapted to brake the rotation of a rotation element, which is adapted to be drivingly connected to the wheel, wherein the brake disc unit comprises a first set of discs and a second set of discs arranged in an alternating manner in an axial direction, the second set of discs comprising at least two flat, spaced discs, wherein the discs in the first disc set are adapted to be rotationally rigidly connected to the rotation element, and at least one separator element, which is adapted to keep a sufficient distance between the two spaced discs of the second disc set for an intermediate disc from the first disc set to rotate at least substantially freely relative to the spaced discs when the brake disc unit is in a deactivated condition, wherein the separator element comprises a projection disposed at a periphery of at least one of the two spaced discs and extending in the axial direction, the projection being flexible relative to the at least one of the two spaced discs.

2. A wheel brake according to claim 1, wherein the separator element extends from one of the discs of the second disc set.

3. A wheel brake according to claim 2, wherein the separator element comprises at least a first projection.

4. A wheel brake according to claim 3, wherein a second projection extends from an adjacent disc in the same disc set, and that the first projection is adapted to abut the second projection.

5. A wheel brake according to claim 4, wherein at least one of the first projection and second projection is resilient.

6. A wheel brake according to claim 2, wherein the separator element is adapted to abut a spaced disc in the second disc set.

7. A wheel brake according to claim 1, wherein the separator element is variable between a first state, in which the intermediate disc may rotate at least substantially freely relative to the spaced discs, and a second state, in which the intermediate disc is clamped between the spaced discs of the second disc set.

8. A wheel brake according to claim 7, wherein the brake disc unit is deactivated in the first state, and activated in the second state.

9. A wheel brake according to claim 7, wherein the separator element has a larger axial extension than the intermediate disc in the first state, and at least as small an axial extension as the intermediate disc in the second state.

10. A wheel brake according to claim 7, wherein the separator element has a larger potential energy in the second state than in the first state.

11. A vehicle comprising at least one wheel brake according to claim 1.

12. A vehicle according to claim 11, wherein the vehicle is a work vehicle.

13. A wheel brake according to claim 1, wherein the projection is resilient.

14. A wheel brake according to claim 1, wherein the separator element is adapted to return the two spaced discs of the one disc set to the relative distance after an activation of the brake disc unit.

15. A wheel brake according to claim 1, wherein the projection has a component both in the axial direction and a radial direction of the brake.

16. A wheel brake according to claim 1, wherein the separator element is positioned at a periphery of the brake disc unit.

17. A wheel brake according to claim 1, wherein the separator element forms a unitary part with one of the discs of the second disc set.

18. A wheel brake according to claim 1, wherein a plurality of separator elements are circumferentially spaced along the associated disc.

19. A wheel brake according to claim 1, wherein a further separator element is adapted to keep a sufficient axial distance between a further pair of spaced discs for a further intermediate disc from the first disc set to rotate at least substantially freely when the brake disc unit is in the deactivated condition.

20. A wet disc brake comprising a wheel brake according to claim 1.

* * * * *